US012672999B2

(12) United States Patent
Zhang et al.

(10) Patent No.: US 12,672,999 B2
(45) Date of Patent: Jul. 7, 2026

(54) HAND EXOSKELETON, MEDICAL DEVICE AND SIMULATED GRABBING SYSTEM

(71) Applicant: TENCENT TECHNOLOGY (SHENZHEN) COMPANY LIMITED, Shenzhen (CN)

(72) Inventors: Dongsheng Zhang, Shenzhen (CN); Chuanzheng Ni, Shenzhen (CN); Xianyu Song, Shenzhen (CN); Kun Xiong, Shenzhen (CN); Lei Wei, Shenzhen (CN); Zhengyou Zhang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 907 days.

(21) Appl. No.: 17/959,740

(22) Filed: Oct. 4, 2022

(65) Prior Publication Data

US 2023/0026300 A1 Jan. 26, 2023

Related U.S. Application Data

(63) Continuation of application No. PCT/CN2021/124583, filed on Oct. 19, 2021.

(30) Foreign Application Priority Data

Nov. 3, 2020 (CN) .......................... 202011212477.8

(51) Int. Cl.
*A61H 1/02* (2006.01)
*B25J 9/00* (2006.01)

(52) U.S. Cl.
CPC .......... *A61H 1/0288* (2013.01); *B25J 9/0006* (2013.01); *A61H 2201/1207* (2013.01); *A61H 2201/1638* (2013.01); *A61H 2201/501* (2013.01)

(58) Field of Classification Search
CPC .......... A61H 1/0288; A61H 2201/1207; A61H 2201/1638; A61H 2201/501; B25J 3/04; B25J 9/0006; B25J 13/02; B25J 13/025
See application file for complete search history.

(56) References Cited

U.S. PATENT DOCUMENTS 5,516,249 A * 5/1996 Brimhall ............... E02F 9/2008
703/3
5,656,904 A * 8/1997 Lander ...................... A61F 2/70
414/730

(Continued)

FOREIGN PATENT DOCUMENTS

CN 103315880 A 9/2013
CN 104768714 A 7/2015
(Continued)

OTHER PUBLICATIONS

The World Intellectual Property Organization (WIPO) International Search Report for PCT/CN2021/124583 Jan. 20, 2022 7 Pages (including translation).

*Primary Examiner* — Saul Rodriguez
*Assistant Examiner* — Brendan P Tighe
(74) *Attorney, Agent, or Firm* — Anova Law Group, PLLC

(57) ABSTRACT

A hand exoskeleton includes at least one mechanical finger and a mechanical palm; and the mechanical finger includes a finger section, a rod assembly and a motor, the finger section includes a first finger section and a second finger section, and the rod assembly includes a first rod assembly and a second rod assembly. The motor capable of controlling the hand exoskeleton is arranged in the hand exoskeleton, and motion constraint on the finger section is realized by constraining a rod through the motor in the movement (Continued)

Master end 101 ⟶ Slave end 102 process of the hand exoskeleton, so that motion limitation on the hand exoskeleton is realized.

15 Claims, 14 Drawing Sheets

(56)                    References Cited

U.S. PATENT DOCUMENTS

| | | | | |
|---|---|---|---|---|
| 5,845,540 | A * | 12/1998 | Rosheim | B25J 3/04 |
| | | | | 414/4 |
| 5,912,658 | A * | 6/1999 | Bergamasco | B25J 9/0006 |
| | | | | 600/595 |
| 2010/0305717 | A1 * | 12/2010 | Tong | A63B 21/4019 |
| | | | | 623/64 |
| 2016/0259417 | A1 * | 9/2016 | Gu | G06F 3/014 |
| 2016/0296345 | A1 * | 10/2016 | Deshpande | A61F 2/586 |
| 2018/0335841 | A1 * | 11/2018 | Rubin | G06F 3/0233 |
| 2020/0050269 | A1 * | 2/2020 | Gu | B25J 9/0006 |
| 2020/0093677 | A1 * | 3/2020 | Mak | A61H 1/0288 |
| 2020/0375287 | A1 * | 12/2020 | Ben-Tzvi | A61F 4/00 |
| 2022/0079831 | A1 * | 3/2022 | Ahmed | B25J 9/1633 |
| 2023/0166391 | A1 * | 6/2023 | Chauhan | A61H 1/0288 |
| | | | | 601/5 |

FOREIGN PATENT DOCUMENTS

| | | | | | |
|---|---|---|---|---|---|
| CN | 105943308 | A | | 9/2016 | |
| CN | 108687744 | A | | 10/2018 | |
| CN | 208301849 | U | | 1/2019 | |
| CN | 109512635 | A * | 3/2019 | | A61H 1/0288 |
| CN | 109793640 | A | | 5/2019 | |
| CN | 110039507 | A * | 7/2019 | | B25J 9/1633 |
| CN | 209207499 | U | | 8/2019 | |
| CN | 210282277 | U | | 4/2020 | |
| CN | 111135011 | A | | 5/2020 | |
| CN | 112338899 | A | | 2/2021 | |
| WO | 2014178694 | A1 | | 11/2014 | |
| WO | 2019033001 | A1 | | 2/2019 | |

* cited by examiner

Master end 101  ⟶  Slave end 102

Third connecting rod assembly
1123: 25, 26, 33

Fourth connecting rod assembly
1124: 27, 28, 29, 34

HAND EXOSKELETON, MEDICAL DEVICE AND SIMULATED GRABBING SYSTEM

RELATED APPLICATION(S)

This application is a continuation application of PCT Patent Application No. PCT/CN2021/124583 filed on Oct. 19, 2021, which claims priority to Chinese Patent Application No. 2020112124778, entitled "HAND EXOSKELETON, MEDICAL DEVICE AND SIMULATED GRABBING SYSTEM" filed with the China National Intellectual Property Administration on Nov. 3, 2020, all of which are incorporated herein by reference in entirety.

FIELD OF THE TECHNOLOGY

The present disclosure relates to the field of robots, in particular, to a hand exoskeleton, a medical device and a simulated grabbing system.

BACKGROUND

A hand exoskeleton is a mechanical apparatus manufactured by simulating a hand structure of a human body, can protect the hand structure of the human body from the outside and can perform actions by matching with the hand of the human body. At present, hand exoskeletons are often applied to a bionic simulation scenario to simulate the grabbing process of an object by a user.

In the scenario, the user wears a hand exoskeleton at a master end and uses the hand wearing the hand exoskeleton to perform simulated grabbing, and at the moment, a manipulator at a remote slave end grabs an object which is also located at the remote slave end according to the motion state of the hand exoskeleton.

However, after the object is grabbed by the manipulator at the remote slave end, the hand exoskeleton will not generate feedback correspondingly, and at this time, the user wearing the hand exoskeleton at the master end will not sense that the manipulator at the slave end has grabbed the object. In the simulated grabbing process, the man-machine interaction performance which can be provided by a hand exoskeleton in a traditional method is poor.

SUMMARY

An embodiment of the present disclosure provides a hand exoskeleton, a medical device and a simulated grabbing system.

In one aspect, the present disclosure provides a hand exoskeleton, and the hand exoskeleton includes: at least one mechanical finger and a mechanical palm; the mechanical finger includes a finger section, a rod assembly and a motor, the motor is movably connected to the rod assembly, and the motor is configured to control motion of the rod assembly; the finger section includes a first finger section and a second finger section, and the rod assembly includes a first rod assembly and a second rod assembly; the first rod assembly is movably connected to the mechanical palm and the first finger section separately; and the second rod assembly is movably connected to the first finger section and the second finger section separately.

In another aspect, the present disclosure provides a medical device, and the medical device includes a hand exoskeleton shown in any embodiment of the present disclosure, and a medical central control device; and the medical central control device is in communication connection with the hand exoskeleton.

In yet another aspect, the present disclosure provides a simulated grabbing system, and the simulated grabbing system includes a hand exoskeleton shown in any embodiment of the present disclosure, a central control device and a simulated grabbing apparatus; and the hand exoskeleton is in communication connection with the simulated grabbing apparatus through the central control device.

In yet another aspect, the present disclosure provides a simulated grabbing system, and the simulated grabbing system includes a hand exoskeleton shown in any embodiment of the present disclosure, a central control device and a simulated grabbing apparatus.

The simulated grabbing apparatus is configured to in response to grabbing of a target object, transmit a first control signal to the central control device, and the control signal is used for applying constraints to the hand exoskeleton; the central control device is configured to forward a first control signal to a motor of the hand exoskeleton; and the motor is configured to receive the first control signal, and control motion of a rod assembly on the basis of the first control signal.

In yet another aspect, the present disclosure provides a simulated grabbing system, and the simulated grabbing system includes a hand exoskeleton shown in any embodiment of the present disclosure, a central control device and a simulated grabbing apparatus; the hand exoskeleton is configured to receive the first control signal, wherein the first control signal is a signal generated in response to a user's operation of the hand exoskeleton; and transmit the first control signal to the central control device; the central control device is configured to forward the first control signal to the simulated grabbing apparatus; and the simulated grabbing apparatus is configured to receive the first control signal, and grab the target object on the basis of the first control signal.

The technical solutions provided in the embodiments of the present disclosure include at least the following beneficial effects:

The motor capable of controlling the hand exoskeleton is arranged in the hand exoskeleton, and motion constraint on the finger section is realized by constraining the rod through the motor in the movement process of the hand exoskeleton, so that motion limitation on the hand exoskeleton is realized. In a scenario corresponding to simulated grabbing, the grabbing condition of a remote mechanical device to the object can be simulated through motion limitation provided by the motor, and man-machine interaction performance which can be provided by the hand exoskeleton is improved.

Details of one or more embodiments of the present disclosure are provided in the accompany drawings and descriptions below. Based on the present disclosure, the accompanying drawings, and the claims of the present disclosure, other features, objectives, and advantages of the present disclosure become clearer.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

Figure 1:
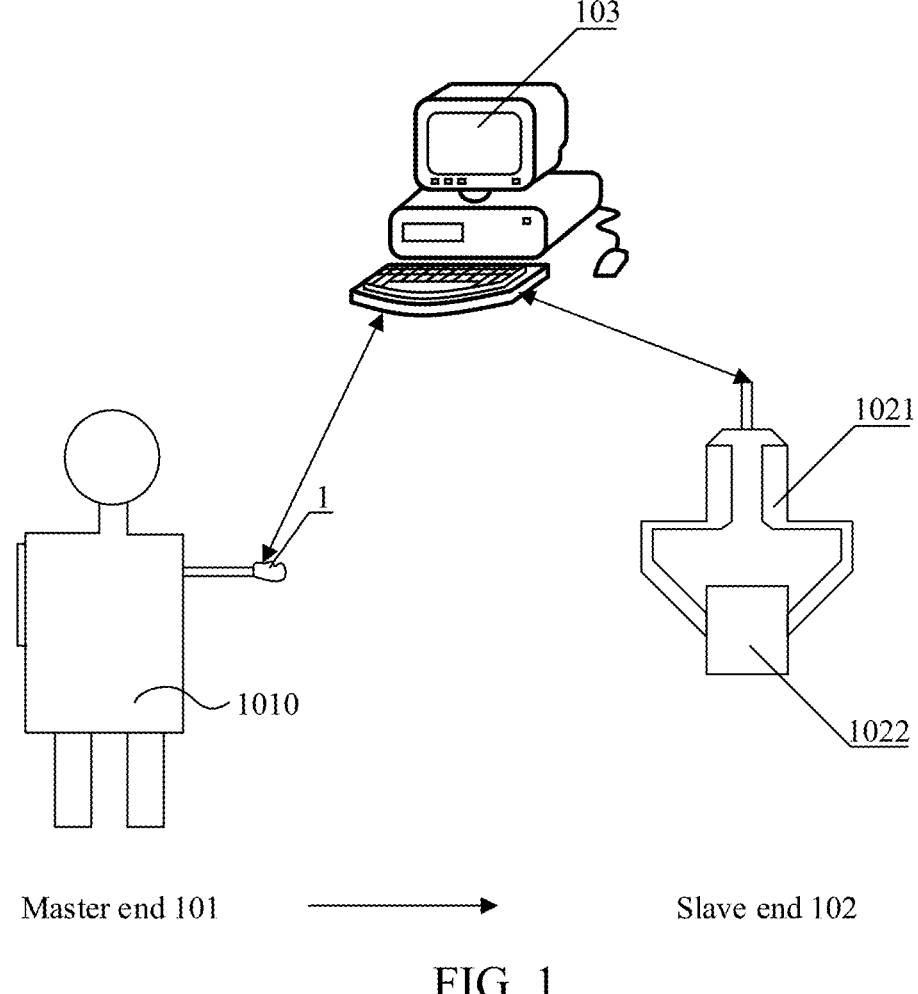
FIG. 1 is a schematic diagram of an implementation scenario of a hand exoskeleton according to certain embodiment(s) of the present disclosure.

Various reference numerals in the drawings are illustrated below:

1—hand exoskeleton;

11—mechanical finger, 12—mechanical palm, 13—extension assembly, 14—first encoder, 15—second encoder;

111—finger section, 112—rod assembly, 113—motor;

1101—first mechanical finger, 1102—second mechanical finger;

1111—first finger section, 1112—second finger section, 1113—third finger section;

1121—first rod assembly, 1122—second rod assembly, 1123—third rod assembly, 1124—fourth rod assembly;

1131—First motor, 1132—second motor, 1133—motor rod;

131—bracket, 132—adjusting mechanism, 133—positioning member;

1321—spring, 1322—first through hole, 1323—second through hole, 1324—third through hole, 1325—fourth through hole, 1326—first hinge pin, 1327—second hinge pin, 1328—third hinge pin, 1329—fourth hinge pin;

1331—positioning member encoder;

101—master end, 102—slave end, computing device—103;

1010—user, 1021—manipulator, 1022—object;

21—first rod, 22—second rod, 23—third rod, 24—fourth rod, 25—fifth rod, 26—sixth rod, 27—seventh rod, 28—eighth rod, 29—ninth rod, 210—tenth rod;

3—rod joint;

31—first rod joint, 32—second rod joint, 33—third rod joint, 34—fourth rod joint;

341—fourth rod first joint, 342—fourth rod second joint;

401—thumb, 402—index finger, 403—middle finger, 404—ring finger, 405—little finger;

4011—thumb first knuckle, 4012—thumb second knuckle;

4021—index finger first knuckle, 4022—index finger third knuckle, 4023—index finger second knuckle;

200—medical device, 2010—medical central control device; and

300—simulated grabbing system, 310—central control device, 320—simulated grabbing apparatus.

DESCRIPTION OF EMBODIMENTS

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

When and as applicable, the term "an embodiment," "one embodiment," "some embodiment(s), "some embodiments," "certain embodiment(s)," or "certain embodiments" may refer to one or more subsets of all possible embodiments. When and as applicable, the term "an embodiment," "one embodiment," "some embodiment(s), "some embodiments," "certain embodiment(s)," or "certain embodiments" may refer to the same subset or different subsets of all the possible embodiments, and can be combined with each other without conflict.

In certain embodiments, the term "based on" is employed herein interchangeably with the term "according to."

Unless otherwise defined, all technical terms used in the embodiment of the present disclosure have the same meanings as commonly understood by a person skilled in the field.

In the embodiment of the present disclosure, reference is made to "front" and "rear" as being based on the front and rear as shown in the drawings; and the "first end" and the "second end" are opposite ends.

FIG. 1 is a schematic diagram of an implementation scenario of a hand exoskeleton 1 according to an exemplary embodiment of the present disclosure. Referring to FIG. 1, the implementation scenario includes a master end 101, a slave end 102 and a computing device 103 for achieving data exchange between the master end 101 and the slave end 102. In the master end 101, a user 1010 is included, the user 1010 wears a hand exoskeleton 1, in a process of performing simulated grabbing by using the hand exoskeleton 1, a movement signal of the hand exoskeleton 1 is transmitted into the computing device 103, and is transmitted into a manipulator 1021 of the slave end 102 via the computing device 103, and the manipulator 1021 grabs an object 1022 according to the movement signal. When the manipulator 1021 grabs the object 1022, the manipulator 1021 forwards the grabbing signal to the hand exoskeleton 1 through the computing device 103, and after receiving the grabbing signal, the hand exoskeleton 1 brakes to limit motion of the hand, in the hand exoskeleton 1, of the user 1010.

The implementation scenario of the hand exoskeleton of the present disclosure is described above by way of example only. In another alternative embodiment, the hand exoskeleton of the present disclosure can also be applied to a scenario of postoperative rehabilitation for assisting in a hand operation of a patient. In another alternative embodiment, the hand exoskeleton of the present disclosure can also be applied to the implementation scenario of supporting the weight of a hand to pull a heavy object. The practical implementation mode of the hand exoskeleton is not limited in the present disclosure.

Figure 2:
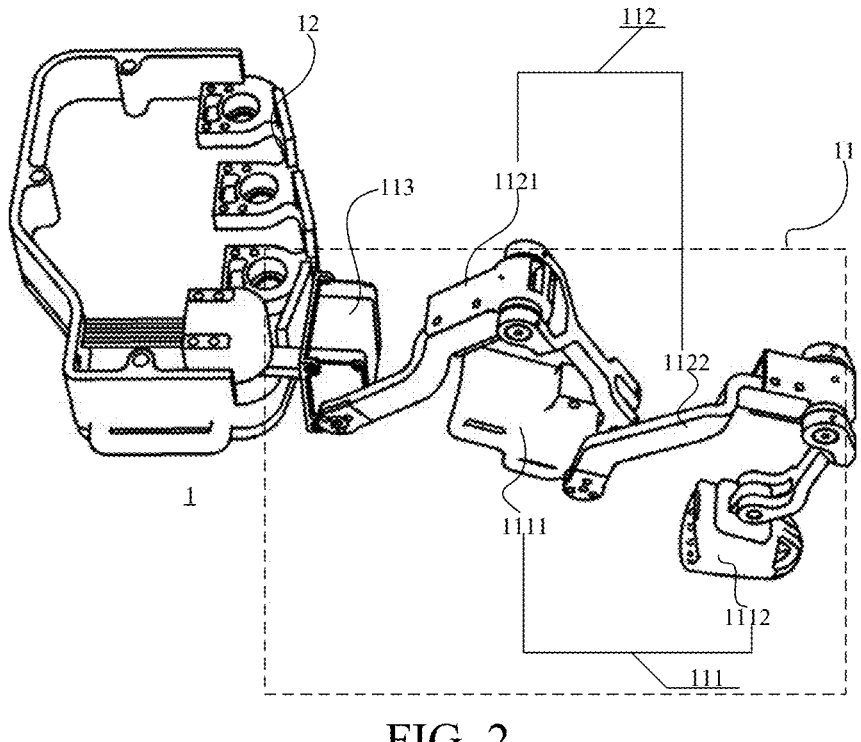
FIG. 2 is a schematic structural diagram of a hand exoskeleton according to certain embodiment(s) of the present disclosure.

FIG. 2 is a schematic structural diagram of a hand exoskeleton 1 according to an exemplary embodiment of the present disclosure, referring to FIG. 2. As shown in FIG. 2, the hand exoskeleton 1 includes at least one mechanical finger 11 and a mechanical palm 12.

The mechanical finger 11 includes a finger section 111, a rod assembly 112 and a motor 113, the finger section 111 includes a first finger section 1111 and a second finger section 1112, a rod assembly 112 includes a first rod assembly 1121 and a second rod assembly 1122, and the motor 113 is configured to control motion of the rod assembly 112; the first rod assembly 1121 is movably connected to the mechanical palm 12 and the first finger section 1111 separately; the second rod assembly 1122 is movably connected to the first finger section 1111 and the second finger section 1112 separately; and the motor 113 is movably connected to the rod assembly 112.

To simulate a hand structure, the hand exoskeleton 1 designed in the present disclosure includes a mechanical finger 11 and a mechanical palm 12. The mechanical finger 11 corresponds to fingers, and the mechanical palm 12 corresponds to a palm. In an embodiment, the number of the mechanical finger 11 is one, to correspond to the situation that a user uses a single finger; alternatively, the number of the mechanical fingers 11 is two, to correspond to the situation that the user uses two fingers; and alternatively, the number of the mechanical fingers 11 is five, to correspond to the situation that the user uses a whole hand. The specific number of the mechanical fingers 11 is not limited in the embodiment of the present disclosure. In one example, when the user uses the hand exoskeleton 1, a hand of the user is supported on the mechanical palm 12, and fingers of the user are inserted into the mechanical fingers 11; and in another example, when the user uses the hand exoskeleton 1, the mechanical palm 12 is located above the hand of the user, and the fingers of the user are inserted into the mechanical fingers 11. The mechanical fingers 11 are movably connected to the mechanical palm 12. In an example, the mechanical fingers 11 are movably connected to the mechanical palm 12 through rods. The connection mode between the mechanical fingers 11 and the mechanical palm 12 is not limited in the embodiment of the present disclosure.

In an example shown in FIG. 2, the number of the mechanical finger 11 is 1. In the present disclosure, the number of the mechanical finger 11 is not limited.

Figure 3:
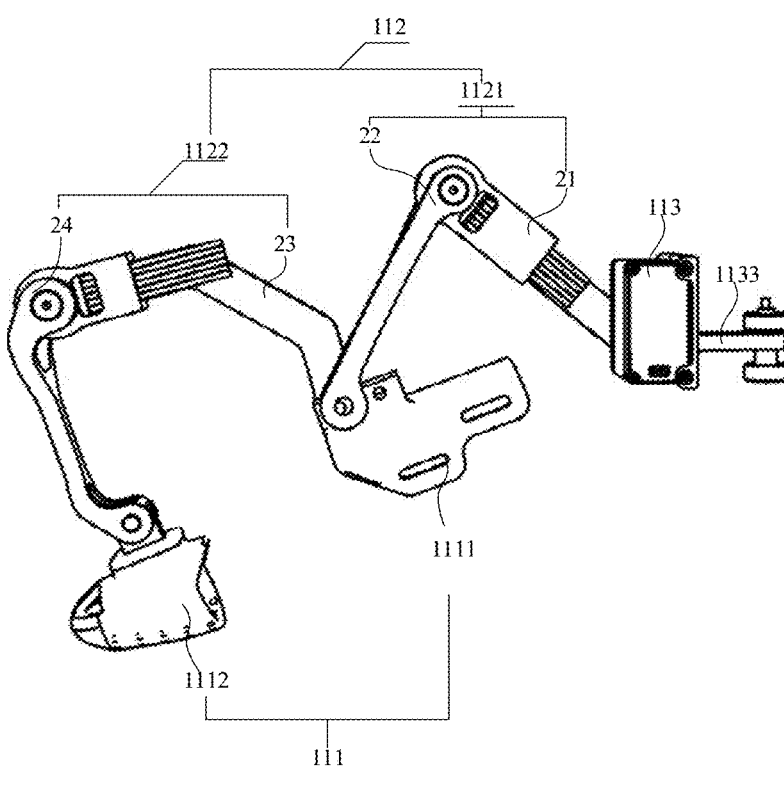
FIG. 3 is a schematic structural diagram of a mechanical finger according to certain embodiment(s) of the present disclosure.

FIG. 3 is a schematic structural diagram of a mechanical finger 11 according to an exemplary embodiment of the present disclosure, referring to FIG. 3. In the embodiment of the present disclosure, the mechanical finger 11 includes a finger section 111, a rod assembly 112 and a motor 113. The finger section 111 includes a first finger section 1111 and a second finger section 1112, and the rod assembly 112 includes a first rod assembly 1121 and a second rod assembly 1122.

In the present disclosure, the finger section 111 may be implemented as a telescopic finger section; alternatively, the finger section 111 may be implemented as a clamping piece type finger section; and alternatively, the finger section 111 may be implemented as a semi-covering type finger section. In the embodiment of the present disclosure, the finger section 111 is taken as a semi-covering type finger section for example.

Figure 4:
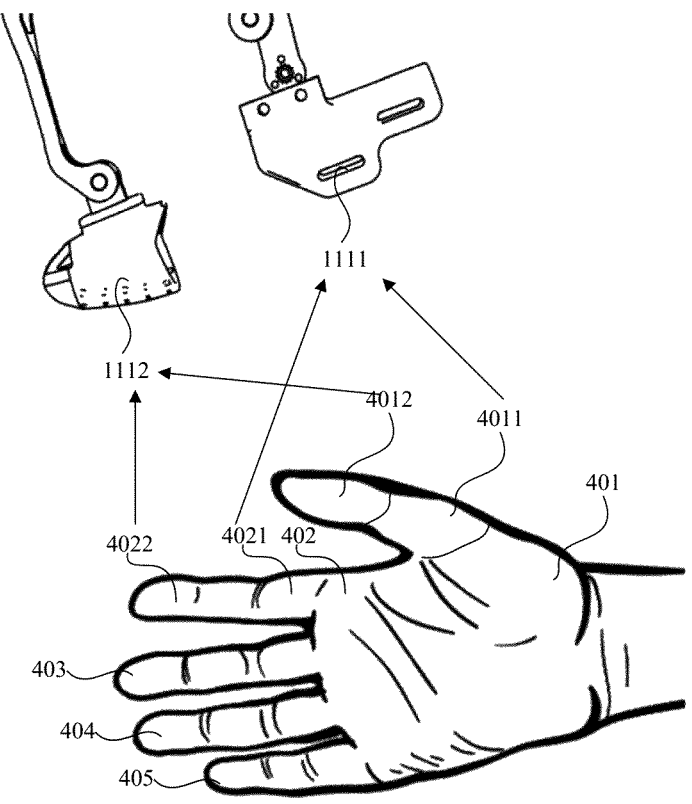
FIG. 4 is a schematic diagram of a correspondence between a hand of a human body and a finger section according to certain embodiment(s) of the present disclosure.

In the embodiment of the present disclosure, a finger section 111 includes a first finger section 1111 and a second finger section 1112. Referring to FIG. 4, during use of the finger section 111 corresponding to a thumb 401 of a human body, the first finger section 1111 corresponds to a thumb first knuckle 4011, and the second finger section 1112 corresponds to a thumb second knuckle 4012; and during use of the finger section 111 corresponding to an index finger 402 of a human body, the first finger section 1111 corresponds to an index finger first knuckle 4021, and the second finger section 1112 corresponds to an index finger third knuckle 4022. When the finger section 111 corresponds to a middle finger 403, a ring finger 404 and a little finger 405 of a human body, the corresponding manner is the same as that of the finger section 111 and the index finger 402.

The rod assembly 112 includes a first rod assembly 1121 and a second rod assembly 1122, and the mechanical palm 12, the first finger section 1111 and the second finger section 1112 are connected by the first rod assembly 1121 and the second rod assembly 1122 successively. In the embodiment of the present disclosure, the first rod assembly 1121 includes a first rod 21 and a second rod 22, and the second rod assembly 1122 includes a third rod 23 and a fourth rod 24. The first rod 21 is connected to the second rod 22 through a first rod joint 31, and by the first rod joint 31, the first rod 21 and the second rod 22 form a revolute pair; and the third rod 23 is connected to the fourth rod 24 through a second rod joint 32, and by the second rod joint 32, the third rod 23 and the fourth rod 24 form a revolute pair. In the embodiment, the first end of the first rod assembly 1121 is connected to the mechanical palm 12, and the second end of the first rod assembly 1121 is connected to the first finger section 1111; and meanwhile, the first end of the second rod assembly 1122 is connected to the first finger section 1111, and the second end of the second rod assembly 1122 is connected to the second finger section 1112. In certain embodiment(s), the first end of the first rod assembly 1121 is the first end of the first rod 21, and the second end of the first rod assembly 1121 is the second end of the second rod 22; and the first end of the second rod assembly 1122 is the first end of the third rod 23, and the second end of the second rod assembly 1122 is the second end of the fourth rod 24. That is, the first end of the first rod 21 is connected to the mechanical palm 12, the first end of the first rod 21 is fixed on an output shaft of the motor 113, and the motor 113 is connected to the mechanical palm 12 through a motor rod 1133. The second end of the second rod 22 is connected to the first finger section 1111, and the second end of the first rod 21 is connected to the first end of the second rod 22 through the first rod joint 31; and the first end of the third rod 23 is connected to the first finger section 1111, the second end of the fourth rod 24 is connected to the second finger section 1112, and the second end of the third rod 23 is connected to the first end of the fourth rod 24 through the second rod joint 32.

Figure 5:
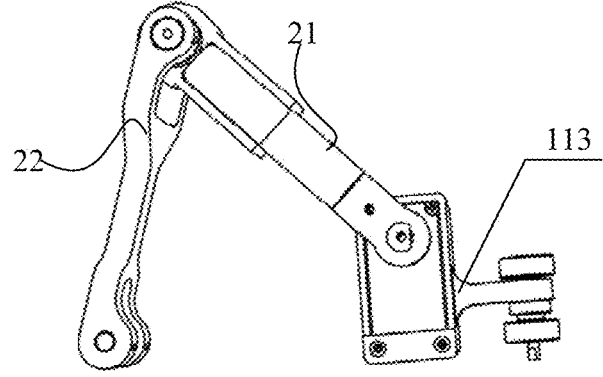
FIG. 5 is a schematic diagram of connection between a first rod and a motor according to certain embodiment(s) of the present disclosure.

The motor 113 is a device which is mounted in the mechanical fingers 11 and drives the mechanical fingers 11 to move. In the embodiment of the present disclosure, the motor 113 may be implemented as a steering engine. In an example, on the basis of the received control signal, the motor 113 drives the mechanical fingers 11 to move according to the control signal. In the embodiment of the present disclosure, the motor 113 drives the mechanical fingers 11 to move according to the control signal through control on the rod assembly 112. In an embodiment of the present disclosure, the number of the motor 113 is one, the motor 113 is located at any position between the mechanical finger 11 and the mechanical palm 12, and the specific position of the motor 113 between the mechanical finger 11 and the mechanical palm 12 is not limited in the present disclosure. Referring to FIG. 5, the motor 113 is connected to the mechanical palm 12 through the motor rod 1133, and the motor 113 is connected to the first end of the first rod 21 in the first rod assembly 1121, that is, by connection between the first end of the first rod 21 and the motor 113, connection between the first rod and the mechanical palm 12 is realized. As can be seen from FIG. 5, the first end of the first rod 21 is fixedly connected to the output shaft of the motor 113, and when a signal controls a motor shaft in the motor 113 to rotate, the first rod 21 may be driven to rotate.

In an embodiment of the present disclosure, the hand exoskeleton 1 is correspondingly connected to a computing device, the computing device may transmit a signal to the motor 113, and thus, the motor 113 may control the rod assembly 112 according to the signal transmitted by the computing device.

The working principle of the hand exoskeleton in the embodiment of the present disclosure is described by taking the palm, placed above the mechanical palm, of the user and the finger inserted into the mechanical finger as the index finger as an example: the user places the palm above the mechanical palm and inserts the finger into the mechanical finger to wear the hand exoskeleton, after the user wears the hand exoskeleton, the first finger section corresponds to a first knuckle of the finger of the user, and the second finger section corresponds to a third knuckle of the finger of the user. In a motion process, active motion of the finger of the user may be achieved, wherein motion of the first knuckle of the user drives motion of the first finger section of the hand exoskeleton; and alternatively, the rod assembly is driven to move by the motor, the finger section is driven by the rod assembly, and the finger of the user is driven to perform passive motion. In the motion process, the motor located between the mechanical palm and the first end of the first rod may limit the motion of the mechanical finger by constraining the motion mode of the first end of the first rod, and thus, motion constraint on the hand exoskeleton is realized.

According to the hand exoskeleton provided by the embodiment of the present disclosure, the motor capable of controlling the hand exoskeleton is arranged in the hand exoskeleton, in the movement process of the hand exoskeleton, motion constraint on the finger section is realized by constraining the rod by the motor, and thus, motion limitation on the hand exoskeleton is realized. In a scenario corresponding to simulated grabbing, the grabbing condition of a remote mechanical device to the object can be simulated through motion limitation provided by the motor, and man-machine interaction performance which can be provided by the hand exoskeleton is improved.

Figure 6:
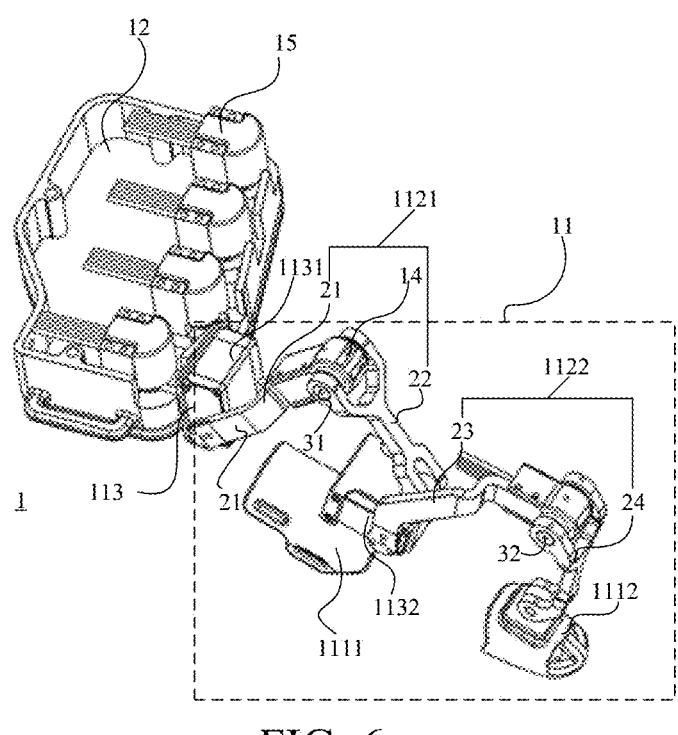
FIG. 6 is a schematic structural diagram of a hand exoskeleton according to certain embodiment(s) of the present disclosure.

FIG. 6 is a schematic structural diagram of a hand exoskeleton 1 according to an exemplary embodiment of the present disclosure. Referring to FIG. 6, the hand exoskeleton 1 includes a mechanical finger 11, a mechanical palm 12, a first encoder 14 and a second encoder 15, wherein the mechanical finger 11 includes a finger section 111, a rod assembly 112, a first motor 1131 and a second motor 1132. The finger section 111 includes a first finger section 1111 and a second finger section 1112, and the rod assembly 112 includes a first rod assembly 1121 and a second rod assembly 1122.

For example, the finger inserted into the mechanical finger 11 is an index finger with three knuckles in the embodiment of the present disclosure.

In an example, a first motor 1131 is connected to the first rod assembly 1121, and a second motor 1132 is connected to the second rod assembly 1122. In the embodiment of the present disclosure, the first motor 1131 and the second motor 1132 are both implemented as a steering engine.

In the embodiment of the present disclosure, as described in the embodiment of the present disclosure, the first rod assembly 1121 includes a first rod 21, a second rod 22 and a first rod joint 31, and the second rod assembly 1122 includes a third rod 23, a fourth rod 24 and a second rod joint 32. The second end of the first rod assembly 1121 is connected to the first finger section 1111; and meanwhile, the first end of the second rod assembly 1122 is connected to the first finger section 1111, and the second end of the second rod assembly 1122 is connected to the second finger section 1112. In certain embodiment(s), the first end of the first rod assembly 1121 is the first end of the first rod 21, and the second end of the first rod assembly 1121 is the second end of the second rod 22; and the first end of the second rod assembly 1122 is the first end of the third rod 23, and the second end of the second rod assembly 1122 is the second end of the fourth rod 24. That is, the first end of the first rod 21 is connected to the mechanical palm 12, in certain embodiment(s), the first end of the first rod 21 is fixed on an output shaft of the motor 113, and the motor 113 is connected to the mechanical palm 12 through a motor rod 1133. The second end of the second rod 22 is connected to the first finger section 1111, and the second end of the first rod 21 is connected to the first end of the second rod 22 through the first rod joint 31; and the first end of the third rod 23 is connected to the first finger section 1111. In certain embodiment(s), the third rod assembly 1123 is fixedly connected to the output shaft of the motor 113, and meanwhile, the motor 113 is fixed on the first finger section 1111. The second end of the fourth rod 24 is connected to the second finger section 1112, and the second end of the third rod 23 is connected to the first end of the fourth rod 24 through the second rod joint 32.

Figure 7:
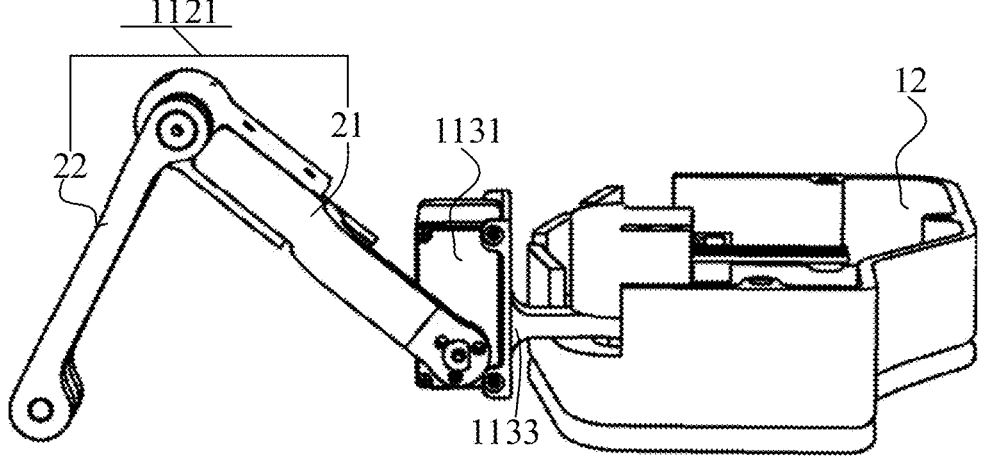
FIG. 7 is a schematic diagram of a connection relationship between a first motor and other mechanisms according to certain embodiment(s) of the present disclosure.

Referring to FIG. 7, in the embodiment of the present disclosure, the first motor 1131 is located between the mechanical palm 12 and the first rod assembly 1121, and the mechanical palm 12 is movably connected to the first end of the first rod assembly 1121 through the first motor 1131. In certain embodiment(s), the first end of the first rod assembly 1121 is fixedly connected to the output shaft of the first motor 1131, and meanwhile, the first motor 1131 is connected to the mechanical palm 12 through the motor rod 1133.

In an example of the embodiment of the present disclosure, the first motor 1131 is located between the mechanical palm 12 and the first rod 21. In other examples of the embodiment of the present disclosure, the first motor 1131 is fixed on the motor rod 1133, the motor rod 1133 and the mechanical palm 12 form a revolute pair, and the motor rod 1133 is connected to the mechanical palm 12 in a revolute pair manner. In an example, the first motor 1131 is located above the mechanical palm 12; and in another example, the first motor 1131 is located below the mechanical palm 12. In the embodiment of the present disclosure, the relative positions of the mechanical palm 12 and the first motor 1131 are not limited, and it ensures that the first motor 1131 is located between the mechanical palm 12 and the first rod 21 to achieve connection between the mechanical palm 12 and the first rod 21 through the first motor 1131. In an example, the second end of the motor rod 1133 is connected to the mechanical palm 12 through a screw; and in another example, the second end of the motor rod 1133 is in clamped connection with the mechanical palm 12 through a mechanism with a buckle and a buckle slot. In the embodiment of the present disclosure, the connection mode between the motor rod 1133 and the mechanical palm 12 is not limited.

In the embodiment of the present disclosure, a revolute pair is arranged between the first rod 21 and the mechanical palm 12, the revolute pair is controlled by the first motor 1131, and the first motor 1131 may limit the motion state of the revolute pair according to the received control signal; alternatively, the revolute pair is constrained so that the revolute pair cannot move; and alternatively, an auxiliary force is provided for the revolute pair to assist in motion of the revolute pair. Because the revolute pair between the first rod 21 and the first motor 1131 is limited, the first end of the first rod 21 may not move. After the finger of the user is inserted into the mechanical finger 11 and the first motor 1131 constrains the revolute pair according to the control signal, the first finger section of the finger of the user is constrained, and cannot move.

Figure 8:
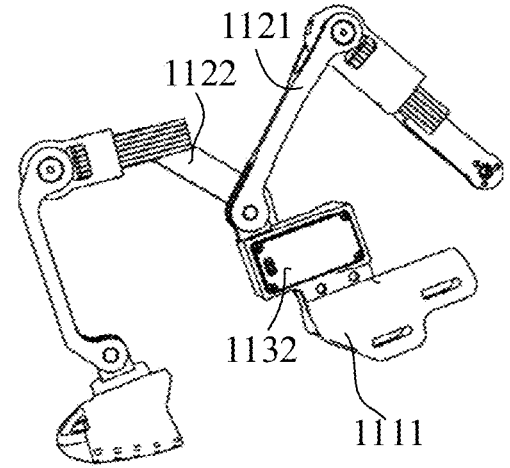
FIG. 8 is a schematic diagram of a connection relationship between a second motor and other mechanisms according to certain embodiment(s) of the present disclosure.

The second motor 1132 is located between the first finger section 1111 and the second rod assembly 1122, and the second end of the first rod assembly 1121 and the first finger section 1111 are movably connected to the first end of the second rod assembly 1122 through the second motor 1132. The second end of the second rod assembly 1122 is movably connected to the second finger section 1112. In certain embodiment(s), referring to FIG. 8, the third rod assembly 1123 is fixedly connected to an output shaft of the second motor 1132, and meanwhile, the second motor 1132 is fixed on the first finger section 1111. In the embodiment of the present disclosure, the second motor 1132 is configured to control the second rod assembly 1122. In an example, a revolute pair is arranged between the second rod assembly 1122 and the first finger section 1111, and the revolute pair is controlled by the second motor 1132. The second motor 1132 may limit the motion state of the revolute pair according to the received control signal, alternatively, the revolute pair is constrained so that the revolute pair may not move, and after the finger of the user is inserted into the mechanical finger 11 and the second motor 1132 constrains the revolute pair according to the control signal, due to the coupling relationship between a second knuckle and a third knuckle of a human body, the action of the third knuckle is also limited, that is, the second knuckle and the third knuckle of the finger of the user are limited simultaneously.

In the embodiment of the present disclosure, the hand exoskeleton 1 is further provided with a first encoder 14 and a second encoder 15, the first encoder 14 is located on the rod assembly 112, and the first encoder 14 is connected to the rod joint 3; and the second encoder 15 is located on the mechanical palm 12, and the second encoder 15 is connected to the motor rod 1133.

In the embodiment of the present disclosure, an encoder for recording an angle formed by two rods in the rod mechanism is referred to by the name of "first encoder", and an encoder for recording intorsion and extorsion information of the finger is referred to by the name of "second encoder".

In the embodiment of the present disclosure, the first encoder 14 is located at the position of the first rod joint 31, alternatively, the first encoder 14 is located at the position of the second rod joint 32, alternatively, the first encoder 14 is located at the positions of the first rod joint 31 and the second rod joint 32, and the specific position of the first encoder 14 is not limited in the embodiment of the present disclosure. In an embodiment, the first encoder 14 is an angle encoder, and the angle encoder records an angle between the two rods connected through the rod joint 3.

In the embodiment of the present disclosure, the second encoder 15 is located on the mechanical palm 12. In certain embodiment(s), the first motor 1131 is fixed on the motor rod 1133, a revolute pair is formed between the motor rod 1133 and the mechanical palm 12, a revolute pair is formed between the motor rod 1133 and the mechanical palm 12, and the second encoder 15 is mounted at the rotating joint where the revolute pair is formed. The second encoder 15 is configured to record the intorsion and extorsion information of the finger, placed in the mechanical finger 11, of the user, and encoder records corresponding to the second encoder 15 are obtained according to the angle at which the motor rod 1133 is unfolded relative to the mechanical palm 12. In an example, the second encoder 15 is also an angle encoder.

In an embodiment, the first encoder 14 and the second encoder 15 are both implemented as a magnetic encoder.

In an embodiment of the present disclosure, the hand exoskeleton 1 is correspondingly connected to a computing device, and the computing device may receive encoder signals which are transmitted by the first encoder 14 and the second encoder 15, and determine the current attitude of the hand exoskeleton 1 according to the encoder signals.

The working principle of the hand exoskeleton in the embodiment of the present disclosure is described by taking the palm, placed below the mechanical palm, of the user and the finger inserted into the mechanical finger as the index finger as an example: the user places the palm below the mechanical palm and inserts the finger into the mechanical finger to wear the hand exoskeleton, after the user wears the hand exoskeleton, the first finger section corresponds to the first knuckle of the finger of the user, and the second finger section corresponds to the third knuckle of the finger of the user.

In the motion process, active motion of the finger of the user may be achieved, wherein motion of the first knuckle of the user drives motion of the first finger section of the hand exoskeleton, and coupled motion of the second knuckle and the third knuckle of the user drives motion of the second finger section of the hand exoskeleton; and alternatively, the rod assembly is driven to move by the motor, the finger section is driven by the rod assembly, and the finger of the user is driven to perform passive motion.

In the motion process, the first motor located between the mechanical palm and the first end of the first rod may limit the motion of the first rod assembly by constraining the motion mode of the first end of the first rod, and the first finger section is fixed; and the second motor which clings to the first finger section may limit the motion of the second rod assembly by constraining the motion mode of the first end of the third rod, and the second finger section is fixed.

In addition, the first encoder arranged at the position of the first rod joint may be configured to acquire the angle formed by the two rods, and determine the flexion and extension attitude of the fingers; and the second encoder arranged on the mechanical palm may be connected to the motor rod and acquires intorsion and extorsion attitude of the finger of the user.

According to the hand exoskeleton provided by the embodiment of the present disclosure, the motor capable of controlling the hand exoskeleton is arranged in the hand exoskeleton, in the movement process of the hand exoskeleton, motion constraint on the finger section is realized by constraining the rod by the motor, and thus, motion limitation on the hand exoskeleton is realized. In a scenario corresponding to simulated grabbing, the grabbing condition of a remote mechanical device to the object can be simulated through motion limitation provided by the motor, and man-machine interaction performance which can be provided by the hand exoskeleton is improved.

By arrangement of the first motor, the motion state of the first rod assembly is controlled by the first motor, and thus, the position of the first finger section is limited; and by arrangement of the second motor, the motion state of the second rod assembly is controlled by the second motor, and thus, the position of the second finger section is limited. Through combined control of the two motors, the user can feel more real constrained acting force of the knuckles of the finger according to actual conditions in a passive motion state, and the man-machine interaction performance which can be provided by the hand exoskeleton is further improved.

By arrangement of the first encoder, the rotation state of the rod assembly may be acquired by an electronic device connected to the hand exoskeleton, the real flexion and extension state of the finger may be simulated, and the hand data receiving efficiency is improved.

By arrangement of the second encoder, when a hand of the user is connected to a mechanical palm portion, the electronic device connected to the hand exoskeleton may acquire the intorsion and extorsion attitude of the finger, and the hand data receiving efficiency is further improved.

Figure 9:
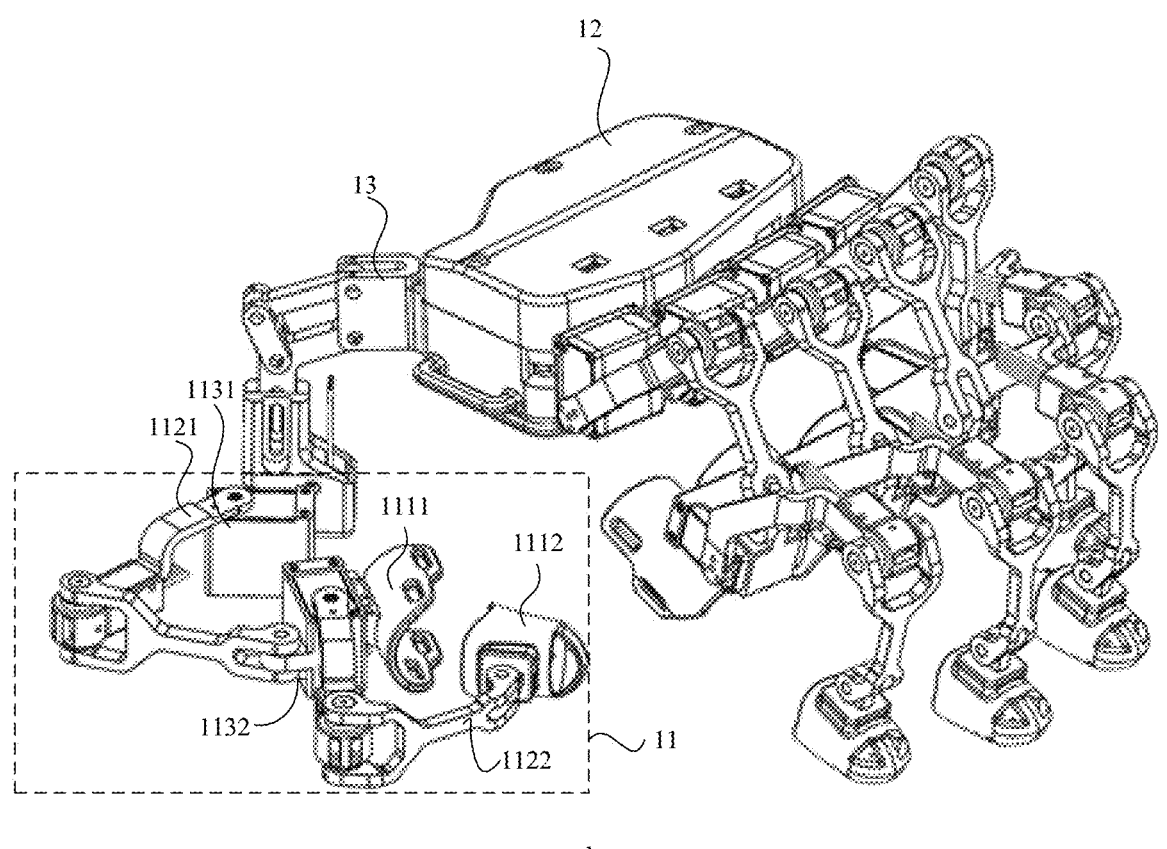
FIG. 9 is a schematic diagram of a hand exoskeleton according to certain embodiment(s) of the present disclosure.

FIG. 9 is a schematic diagram of a hand exoskeleton 1 according to an exemplary embodiment of the present disclosure. In the hand exoskeleton 1, five mechanical fingers 11, a mechanical palm 12 and a set of extension assemblies 13 are included. The five mechanical fingers 11 respectively correspond to the thumb, index finger, middle finger, ring finger and little finger of a hand of a human body. That is, the hand exoskeleton 1 includes 4 first mechanical fingers 1101 and 1 second mechanical finger 1102.

The mechanical fingers 11 corresponding to the index finger, middle finger, ring finger and little finger have the same structure, and each mechanical finger includes a first finger section 1111, a second finger section 1112, a first rod assembly 1121, a second rod assembly 1122, a first motor 1131 and a second motor 1132. In the embodiment of the present disclosure, the mechanical fingers 11 corresponding to the four fingers are the first mechanical fingers 1101. The connection manner of the above components is the same as that in the embodiment shown in FIG. 6, and is not described herein again, and in the embodiment of the present disclosure, attention is focused on the mechanical finger 11 corresponding to the thumb of the hand of the human body and the related structure thereof. In the embodiment of the present disclosure, the mechanical finger 11 corresponding to the thumb is the second mechanical finger 1102. In the embodiment of the present disclosure, the motor 1131 and the motor 1132 are both implemented as a steering engine.

Figure 10:
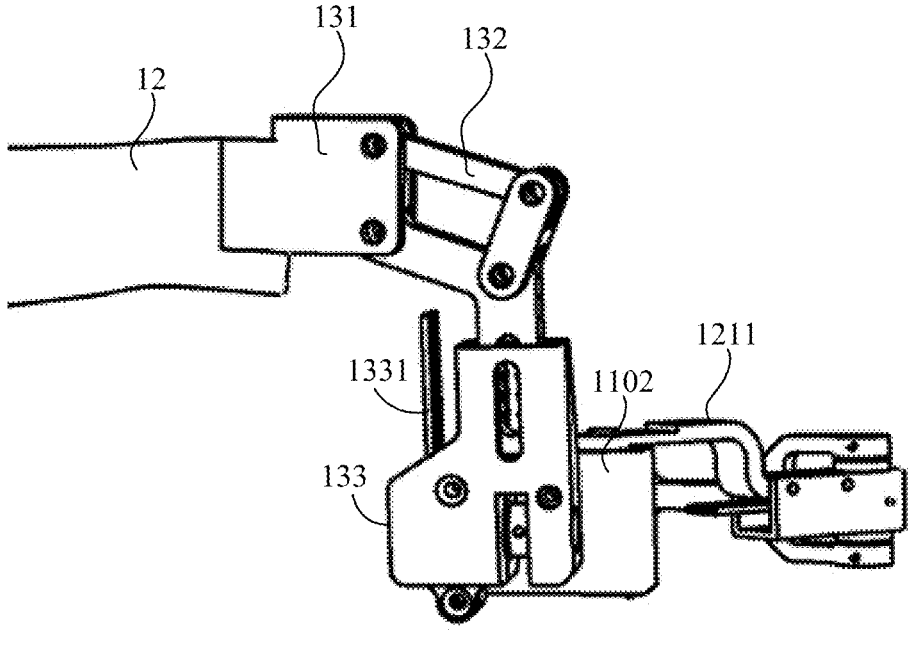
FIG. 10 is a schematic structural diagram of an extension assembly according to certain embodiment(s) of the present disclosure.

Referring to FIG. 10, in the embodiment of the present disclosure, by the extension assembly 13, the second mechanical finger 1102 corresponding to the thumb is connected to the mechanical palm 12, wherein the first end of the extension assembly 13 is connected to the mechanical palm 12, and the second end of the extension assembly 13 is connected to the first end of the first rod assembly 1121 of the second mechanical finger 1102.

In an example, the extension assembly 13 includes a bracket 131, an adjusting mechanism 132 and a positioning member 133. The first end of the bracket 131 is connected to the mechanical palm 12, and the second end of the bracket 131 is connected to the first end of the adjusting mechanism 132.

Due to the structure of the hand of the human body, namely the difference of phalanges of the thumb of the hand of the human body, when the hand of the user grabs an object, the thumb drives part of the metacarpal bones to form a certain angle with the plane where other metacarpal bones are located. Therefore, when the hand exoskeleton 1 of the present disclosure simulates this phenomenon, it is desirable to provide the extension assembly 13 corresponding to the part of the metacarpal bones. In the embodiment of the present disclosure, the bracket 131 is arranged corresponding to the different structures of the thumb and the other four fingers, and the bracket 131 may support the thumb and the corresponding metacarpal bone portion of the user. In the embodiment of the present disclosure, the first end of the bracket 131 is connected to the mechanical palm 12, and the second end of the bracket 131 is connected to the first end of the adjusting mechanism 132. In an embodiment, a certain angle is formed by the bracket 131 and a plane formed by the mechanical palm 12, and in an example, the bracket 131 is perpendicular to the plane formed by the mechanical palm 12.

Figure 11:
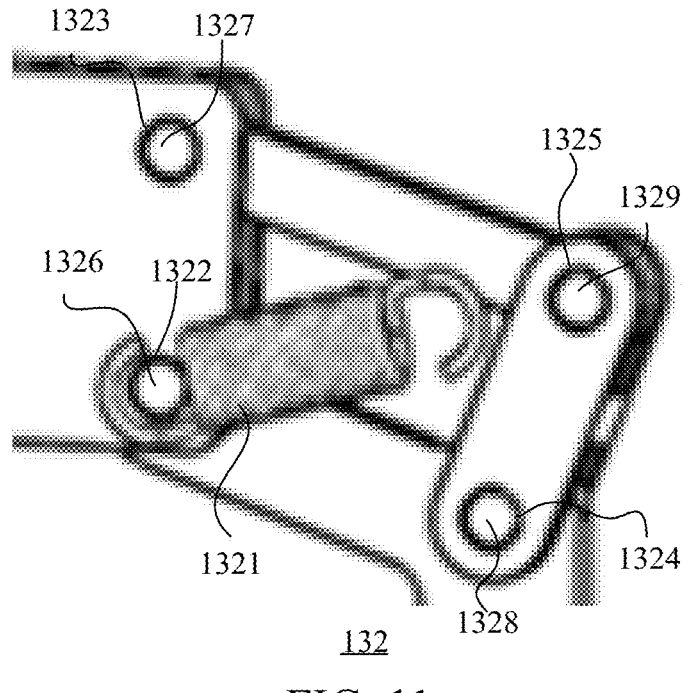
FIG. 11 is a schematic structural diagram of an adjusting mechanism according to certain embodiment(s) of the present disclosure.

The adjusting mechanism 132 is a transitional connection portion between the bracket 131 and the positioning member 133. The adjusting mechanism 132 is configured to determine a space between the bracket 131 and the positioning member 133, so that the hand exoskeleton 1 may fit the thumb portion of the user better. In an example, the adjusting mechanism 132 may be implemented as spring assemblies, and by the elastic force action of the spring assemblies, adjustment of the space between the bracket 131 and the positioning member 133 is achieved. In another example, the adjusting mechanism 132 may be implemented as a combination of a slot and a limiting member, and adjustment of the space between the bracket 131 and the positioning member 133 is achieved by adaptive adjustment between the limiting member and the slot. A specific implementation of the adjusting mechanism 132 is not limited in the embodiment of the present disclosure. In the embodiment of the present disclosure, the adjusting mechanism 132 is implemented as a planar four-bar linkage with a spring 1321. In the embodiment of the present disclosure, the adjusting mechanism 132 is implemented as a set of planar four-bar linkages with a spring 1321, and the extension direction of the adjusting mechanism 132 is parallel to the direction of the bracket 131. Referring to FIG. 11, the adjusting mechanism 132 includes a first through hole 1322, a second through hole 1323, a third through hole 1324 and a fourth through hole 1325. The first through hole 1322 corresponds to a first hinge pin 1326, the second through hole 1323 corresponds to a second hinge pin 1327, a third through hole 1324 corresponds to a third hinge pin 1328, a fourth through hole 1325 corresponds to a fourth hinge pin 1329, and the first hinge pin 1326 is connected to the fourth hinge pin 1329 through a spring.

The second end of the adjusting mechanism 132 is connected to the first end of the positioning member 133.

In the embodiment of the present disclosure, after the adjusting mechanism 132 adjusts the space relationship between the bracket 131 and the positioning member 133 and when the user uses the hand exoskeleton 1, the positioning member 133 fits the metacarpal bones of the thumb portion of the user, and meanwhile, the extension direction of the positioning member 133 corresponds to the extension direction of the thumb. In an embodiment of the present disclosure, the center of the palm of the user faces downwards so that the user wears the hand exoskeleton 1, and after the user wears the hand exoskeleton, the center of the palm of the user may be located above the mechanical palm, or below the mechanical palm. At the moment, the phalanges of the thumb may extend downwards during grabbing, and form a certain angle with the palm, the phalanges of the thumb are supported through the bracket 131, and the downward extension distance of the thumb is adapted through the adjusting mechanism 132. After the adjusting mechanism 132 adapts to the downward extension distance of the thumb, the positioning member 133 may cling to the phalanges of the thumb, and the positions of the phalanges of the thumb are determined.

The second end of the positioning member 133 is connected to the first end of the first rod assembly 1121.

In the embodiment of the present disclosure, the positioning member 133 corresponds to a positioning member encoder 1331 recording the position of the positioning member. In an example, the positioning member encoder 1331 is located in the positioning member 133, and in another example, the positioning member encoder 1331 is located in the adjusting mechanism 132. In the embodiment of the present disclosure, the position of the positioning member encoder 1331 is not limited, but to ensure that the positioning member 133 may acquire the position information of the positioning member timely, in the embodiment of the present disclosure, the positioning member encoder 1331 corresponding to the positioning member is arranged in the positioning member 133, and the positioning member encoder 1331 may record the intorsion and extorsion attitude of the thumb of the user.

In addition, in the embodiment of the present disclosure, the structure of the second mechanical finger 1102 corresponding to the thumb portion is similar to the structures of the first mechanical fingers 1101 corresponding to the other four fingers, and is not described herein again. That is, in the present disclosure, the mechanical finger 11 connected to the extension assembly 13 is referred to as the second mechanical finger 1102, and the mechanical finger 11 which is not connected to the extension assembly 13 is referred to as the first mechanical finger 1101.

In an embodiment of the present disclosure, the hand exoskeleton 1 is correspondingly connected to a computing device, and the computing device may receive encoder signals which are transmitted by the first encoder 14 and the second encoder 15, and determine the current attitude of the hand exoskeleton 1 according to the encoder signals. Meanwhile, in an embodiment of the present disclosure, the hand exoskeleton 1 is correspondingly connected to a computing device, and the computing device may receive a signal transmitted by the positioning member encoder 1331, and record the intorsion and extorsion attitude of the thumb of the user.

The working principle of the hand exoskeleton in the embodiment of the present disclosure is described by taking the palm placed below the mechanical palm, of the user and five fingers correspondingly inserted into the mechanical fingers, of the user as an example:

the user places the palm below the mechanical palm, and inserts the fingers into the mechanical fingers to wear the hand exoskeleton. After the user wears the hand exoskeleton, with regard to the index finger, middle finger, ring finger and little finger, the first finger section corresponds to the first knuckle, and the second finger section corresponds to the third knuckle. With regard to the thumb, the first finger section corresponds to the first knuckle, and the second finger section corresponds to the second knuckle.

In the motion process, active motion of the fingers of the user may be achieved. With regard to the index finger, middle finger, ring finger and little finger, motion of the first knuckle of the user drives motion of the first finger section of the hand exoskeleton, and coupled motion of the second knuckle and the third knuckle of the user drives motion of the second finger section of the hand exoskeleton; and alternatively, the rod assembly is driven to move by the motor, the finger section is driven by the rod assembly, and the finger of the user is driven to perform passive motion. With regard to the thumb, motion of the first knuckle of the user drives motion of the first finger section of the mechanical finger corresponding to the thumb, and motion of the second knuckle of the user drives motion of the second finger section of the mechanical finger corresponding to the thumb.

In the motion process of the fingers of the user, the first motor located between the mechanical palm and the first end of the first rod may limit the motion of the first rod assembly by constraining the motion mode of the first end of the first rod, and the first finger section is fixed; and the second motor which clings to the first finger section may limit the motion of the second rod assembly by constraining the motion mode of the first end of the third rod, and the second finger section is fixed.

In addition, the first encoder arranged at the position of the first rod joint may be configured to acquire an angle formed by two rods, and determine the flexion and extension attitude of the fingers. With regard to the index finger, middle finger, ring finger and little finger, the second encoder arranged on the mechanical palm may be configured to acquire the intorsion and extorsion attitude of the fingers of the user. With regard to the thumb, the metacarpal bones corresponding to the thumb are supported through the bracket in the extension assembly, the position of the thumb is limited by the adjusting mechanism with the spring, and by the positioning member and the positioning member encoder, the intorsion and extorsion attitude of the thumb is determined finally.

According to the hand exoskeleton provided by the embodiment of the present disclosure, the motor capable of controlling the hand exoskeleton is arranged in the hand exoskeleton, in the movement process of the hand exoskeleton, motion constraint on the finger section is realized by constraining the rod by the motor, and thus, motion limitation on the hand exoskeleton is realized. In a scenario corresponding to simulated grabbing, the grabbing condition of a remote mechanical device to the object can be simulated through motion limitation provided by the motor, and man-machine interaction performance which can be provided by the hand exoskeleton is improved.

By arrangement of the extension assemblies corresponding to the phalanges and metacarpal bones of the thumb, the structure of the hand exoskeleton fits the human body better, in the using process, the grabbing condition of a remote mechanical device on an object may be simulated, and man-machine interaction performance which can be provided by a hand skeleton robot is further improved.

By arrangement of the positioning member encoder, when the hand of the user is placed above the mechanical palm portion, the electronic device connected to the hand exoskeleton may acquire the intorsion and extorsion attitude of the thumb and the form of the metacarpal bones, and thus, the hand data receiving efficiency is further improved.

Figure 12:
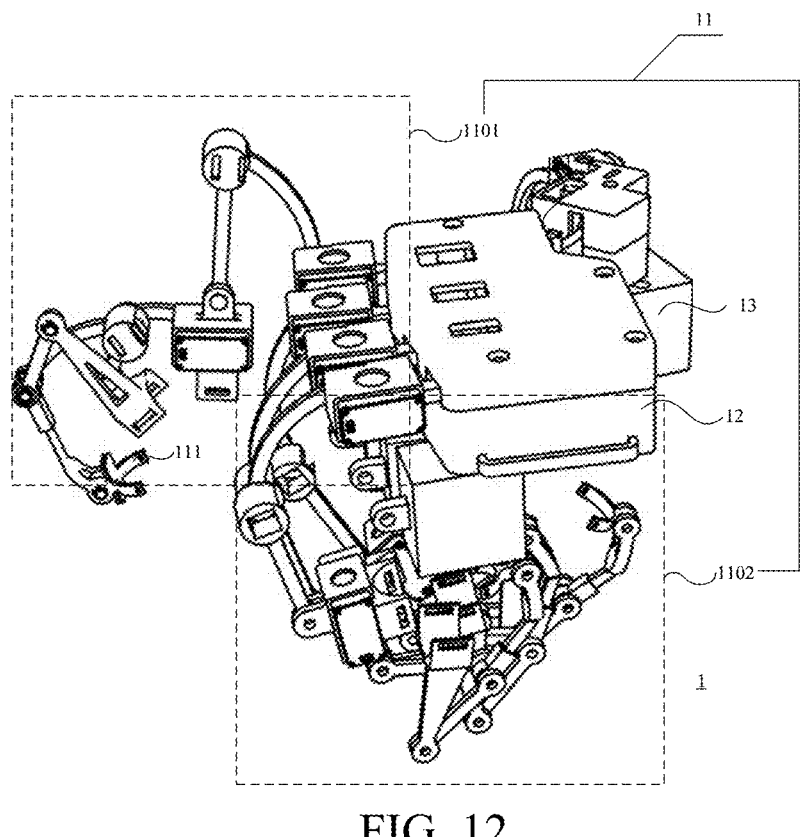
FIG. 12 is a schematic structural diagram of a hand exoskeleton according to certain embodiment(s) of the present disclosure.

FIG. 12 is a schematic structural diagram of a hand exoskeleton 1 according to an exemplary embodiment of the present disclosure. Referring to FIG. 12, the hand exoskeleton 1 includes five mechanical fingers 11 and a mechanical palm 12. The five mechanical fingers 11 respectively correspond to the thumb, index finger, middle finger, ring finger and little finger of a hand of a human body, that is, the five mechanical fingers 11 include 4 first mechanical fingers 1101 and 1 second mechanical finger 1102. In the embodiment of the present disclosure, the finger section 111 in the mechanical finger 11 is a full-covering type finger section, that is, when the user uses the hand exoskeleton 1, each finger section 111 is fixed corresponding to one knuckle of the finger.

Figure 13:
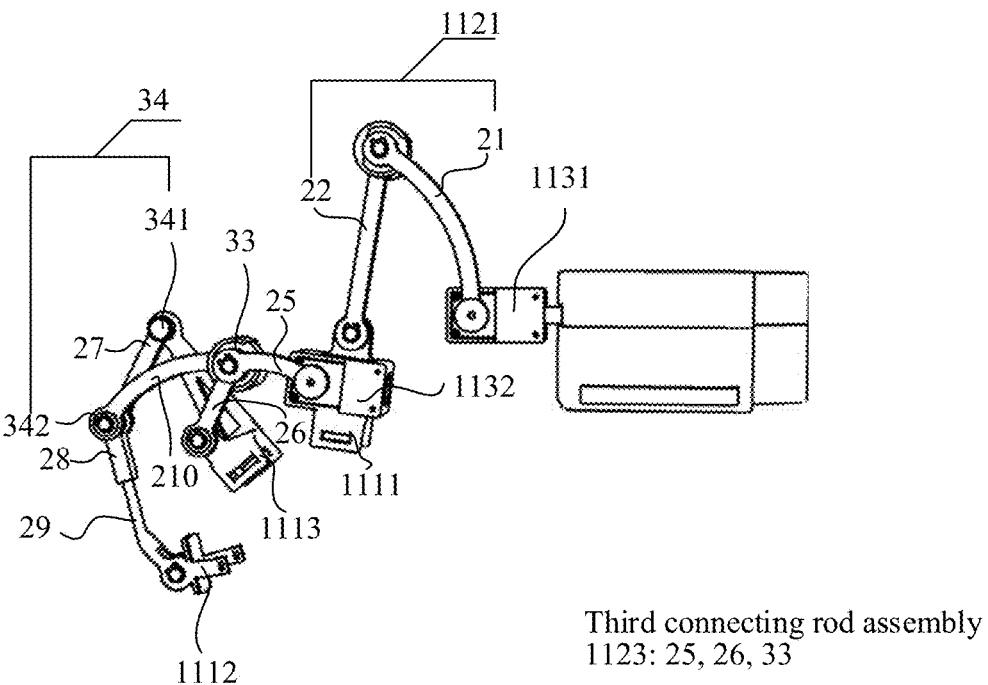
FIG. 13 is a schematic diagram of a mechanical finger according to certain embodiment(s) of the present disclosure.
Figure 14:
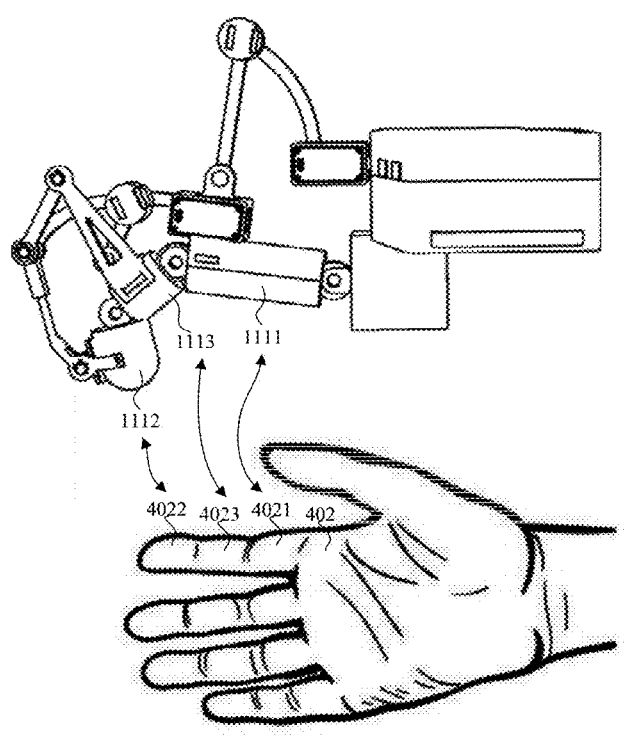
FIG. 14 is a schematic diagram of a correspondence between a hand of a human body and a finger section according to certain embodiment(s) of the present disclosure.

At the moment, referring to FIG. 13, the mechanical finger 11 further includes a third finger section 1113. In the embodiment of the present disclosure, the third finger section 1113 is implemented as a clamping piece type fixing member. The third finger section 1113 is located between the first finger section 1111 and the second finger section 1112.

In the embodiment of the present disclosure, the mechanical finger 11 further includes a third rod assembly 1123 and a fourth rod assembly 1124, wherein the first end of the third rod assembly 1123 is movably connected to the first finger section 1111. In certain embodiment(s), the third rod assembly 1123 is fixedly connected to an output shaft of the second motor 1132, and meanwhile, the second motor 1132 is fixed on the first finger section 1111. The second end of the third rod assembly 1123 is movably connected to the third finger section 1113. The first end of the fourth rod assembly 1124 is movably connected to the third finger section 1113. The second end of the fourth rod assembly 1124 is movably connected to the second finger section 1112.

The third finger section 1113 is designed for four fingers except for the thumb, namely the index finger, middle finger, ring finger and little finger, referring to FIG. 13, the index finger 402 is taken as an example, in the embodiment of the present disclosure, an index finger first knuckle 4021 corresponds to the first finger section 1111, an index finger second knuckle 4023 corresponds to the third finger section 1113, and the index finger third knuckle 4022 corresponds to the second finger section 1112.

To achieve the circumstance that motion of the third finger section 1113 can be constrained by the motor 113 and coupled motion of the third finger section and the second finger section 1112 is implemented, in the embodiment of the present disclosure, a third rod assembly 1123 and a fourth rod assembly 1124 are further included, that is, the second rod assembly 1122 in the above embodiment may alternatively be implemented as a combination of the third rod assembly 1123 and the fourth rod assembly 1124. In the embodiment of the present disclosure, the motor 113 includes a first motor 1131 and a second motor 1132, and the first motor 1131 and the second motor 1132 are both implemented as a steering engine.

In an embodiment, referring to FIG. 13, in the embodiment of the present disclosure, the third finger section 1113 includes an integrally formed fixing member and a rod. The third rod assembly 1123 is composed of a fifth rod 25 and a sixth rod 26, and the fifth rod 25 and the sixth rod 26 are connected to the third rod joint 33. In addition, the first end of the fifth rod 25 is connected to the first finger section 1111, and the second end of the sixth rod 26 is connected to the third finger section 1113. The fourth rod assembly 1124 includes a seventh rod 27, an eighth rod 28 and a ninth rod 29 which are directly connected to a rod portion in the third finger section 1113. The rod portion in the third finger section 1113 is connected to the seventh rod 27 to form a fourth rod first joint 341, and the seventh rod 27 is connected to the eighth rod 28 to form a fourth rod second joint 342.

In an embodiment, to implement coupled motion of the third rod assembly 1123 and the fourth rod assembly 1124, the third rod joint 33 further is connected to a fourth rod joint 34. The fourth rod joint 34 includes a fourth rod first joint 341 and a fourth rod second joint 342, when the third rod joint 33 is connected to the fourth rod first joint 341, due to the fact that the sixth rod 26, the seventh rod 27 and the first joint 341 are located on the rod in the third finger section 1113, the structure may form a stable triangular structure, and cannot move, and in the embodiment of the present disclosure, the third rod joint 33 is connected to the fourth rod second joint 342 through a tenth rod 210.

Under such circumstances, the third rod assembly 1123 is in series connection with the fourth rod assembly 1124 through the third finger section 1113 to form a linkage, and a coupled motion relationship is generated by connection between the third rod joint 33 and the fourth rod second joint 342.

In the embodiment of the present disclosure, the mechanical finger 11 includes a first motor 1131 and a second motor 1132. Referring FIG. 12, the positions and control logic of the first motor 1131 and the second motor 1132 are not changed. The first motor 1131 is configured to control the first rod assembly 1121, and the second motor 1132 is configured to control the third rod assembly 1123 and control the fourth rod assembly 1124 in a coordinated manner.

In an embodiment, in the embodiment of the present disclosure, the positions and received data of the first encoder 14 and the second encoder 15 are not changed.

In an embodiment of the present disclosure, the hand exoskeleton 1 is correspondingly connected to a computing device, and the computing device may receive encoder signals which are transmitted by the first encoder 14 and the second encoder 15, and determine the current attitude of the hand exoskeleton 1 according to the encoder signals. Meanwhile, in an embodiment of the present disclosure, the hand exoskeleton 1 is correspondingly connected to a computing device, and the computing device may receive a signal transmitted by the positioning member encoder, and record the intorsion and extorsion state of the thumb of the user.

The working principle of the hand exoskeleton in the embodiment of the present disclosure is described by taking the hand constrained in the hand exoskeleton, of the user and the five fingers correspondingly inserted into the mechanical fingers, of the user as an example: the user places the palm on the mechanical palm, or places the palm on the back of the hand, and inserts the fingers into the mechanical fingers to wear the hand exoskeleton.

After the user wears the hand exoskeleton, with regard to the index finger, middle finger, ring finger and little finger, the first finger section corresponds to the first knuckle, the second finger section corresponds to the third knuckle, and the third finger section corresponds to the second knuckle.

In the motion process, motion of the first knuckle of the user drives motion of the first finger section of the hand exoskeleton, and coupled motion of the second knuckle and the third knuckle of the user drives motion of the third finger section and the second finger section of the hand exoskeleton. Alternatively, the rod assembly is driven to move by the motor, and the first rod assembly drives the first finger section, and drives the first knuckle of the user to move passively. The third rod assembly and the fourth rod assembly replace the second rod assembly, joints of the rod assembly are connected to each other to achieve coupled motion, and the coupled motion drives the second finger section and the third finger section, and drives the second finger section and the third finger section of the user to passively move jointly. In the above motion process of four fingers, the first motor may limit motion of the first rod assembly by constraining the motion mode of the first end of the first rod, and the first finger section is fixed; and the second motor limits motion of the third rod assembly by constraining the motion mode of the first end of the fifth rod, and due to the coupling action between the fourth rod assembly and the third rod assembly, the second finger section and the third finger section are fixed correspondingly. The second encoder arranged on the mechanical palm may be configured to acquire the intorsion and extorsion attitude of the finger of the user.

With regard to the thumb, the first finger section corresponds to the first knuckle, and the second finger section corresponds to the second knuckle. In the motion process, active motion of the fingers of the user may be achieved. Motion of the first knuckle of the user drives motion of the first finger section of the mechanical finger corresponding to the first knuckle, and motion of the second knuckle of the user drives motion of the second finger section of the mechanical finger corresponding to the second knuckle. In the motion process of the fingers of the user, the first motor located between the mechanical palm and the first end of the first rod may limit the motion of the first rod assembly by constraining the motion mode of the first end of the first rod, and the first finger section is fixed; and the second motor which clings to the first finger section may limit the motion of the second rod assembly by constraining the motion mode of the first end of the third rod, and the second finger section is fixed. With regard to the thumb, the metacarpal bones corresponding to the thumb are supported through the bracket in the extension assembly, the position of the thumb is limited by the adjusting mechanism with the spring, and by the positioning member and the positioning member encoder, the intorsion and extorsion attitude of the thumb is determined finally.

In addition, the first encoder arranged at the position of the first rod joint may be configured to acquire an angle formed by two rods, and determine the flexion and extension attitude of the fingers.

According to the hand exoskeleton provided by the embodiment of the present disclosure, the motor capable of controlling the hand exoskeleton is arranged in the hand exoskeleton, in the movement process of the hand exoskeleton, motion constraint on the finger section is realized by constraining the rod by the motor, and thus, motion limitation on the hand exoskeleton is realized. In a scenario corresponding to simulated grabbing, the grabbing condition of a remote mechanical device to the object can be simulated through motion limitation provided by the motor, and man-machine interaction performance which can be provided by the hand exoskeleton is improved.

The hand exoskeleton is designed into a full-constraining type hand exoskeleton, that is, each finger section is constrained corresponding to the index finger, middle finger, ring finger and little finger, and protection on the hand of the user may be improved.

The third finger section is arranged between the first finger section and the second finger section, and thus, each knuckle of the four fingers, except for the thumb, may be covered correspondingly, and protection on the hand of the user may be further improved.

The second rod assembly is replaced by a combination of the third rod assembly and the fourth rod assembly corresponding to the third finger section, so that the third finger section may be controlled to move by the motor in a coordinated manner, and the man-machine interaction efficiency which can be provided by the hand exoskeleton is further improved.

By connection between the third rod joint and the fourth rod joint, corresponding coupled motion may be formed between the third rod joint and the fourth rod joint, the coupled motion better conforms to the actual condition of a hand of a human body, and the man-machine interaction capability which can be provided by the hand exoskeleton is further improved.

Figure 15:
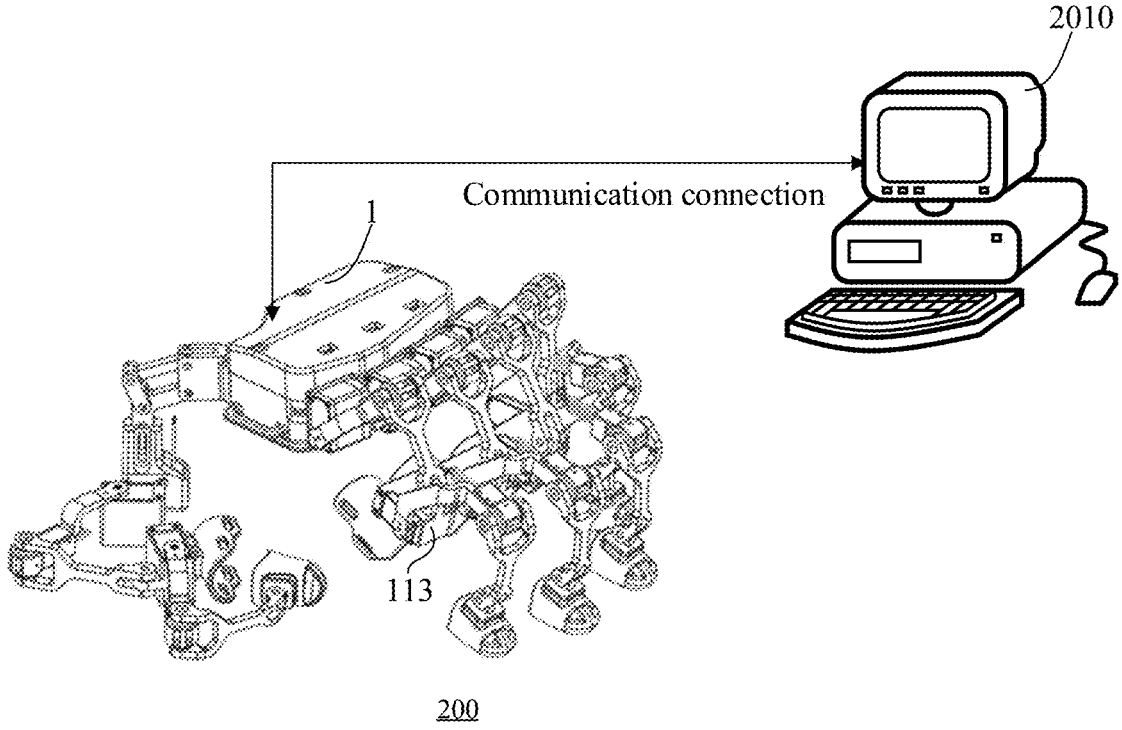
FIG. 15 is a schematic structural diagram of a medical device according to certain embodiment(s) of the present disclosure.

FIG. 15 is a schematic structural diagram of a medical device 200 according to an exemplary embodiment of the present disclosure, wherein the medical device 200 includes a hand exoskeleton 1 according to any one of the embodiments, and a medical central control device 2010.

In the embodiment of the present disclosure, the hand exoskeleton 1 is a hand exoskeleton 1 with a motor 113. The medical central control device 2010 is in communication connection with the hand exoskeleton 1. After the medical central control device 2010 is in communication connection with the hand exoskeleton 1, the medical central control device 2010 may transmit a control instruction to the hand exoskeleton 1 by the communication connection. The control instruction is received by the motor 113. After receiving the control instruction, the motor 113 constrains motion of the hand exoskeleton 1 according to the control instruction.

According to the medical device provided by the embodiment of the present disclosure, by communication connection between the hand exoskeleton and the medical central control device, the medical central control device may control the motor in the hand exoskeleton, motion limitation on the hand exoskeleton is realized, and man-machine interaction performance which can be provided by the hand exoskeleton is improved.

Figure 16:
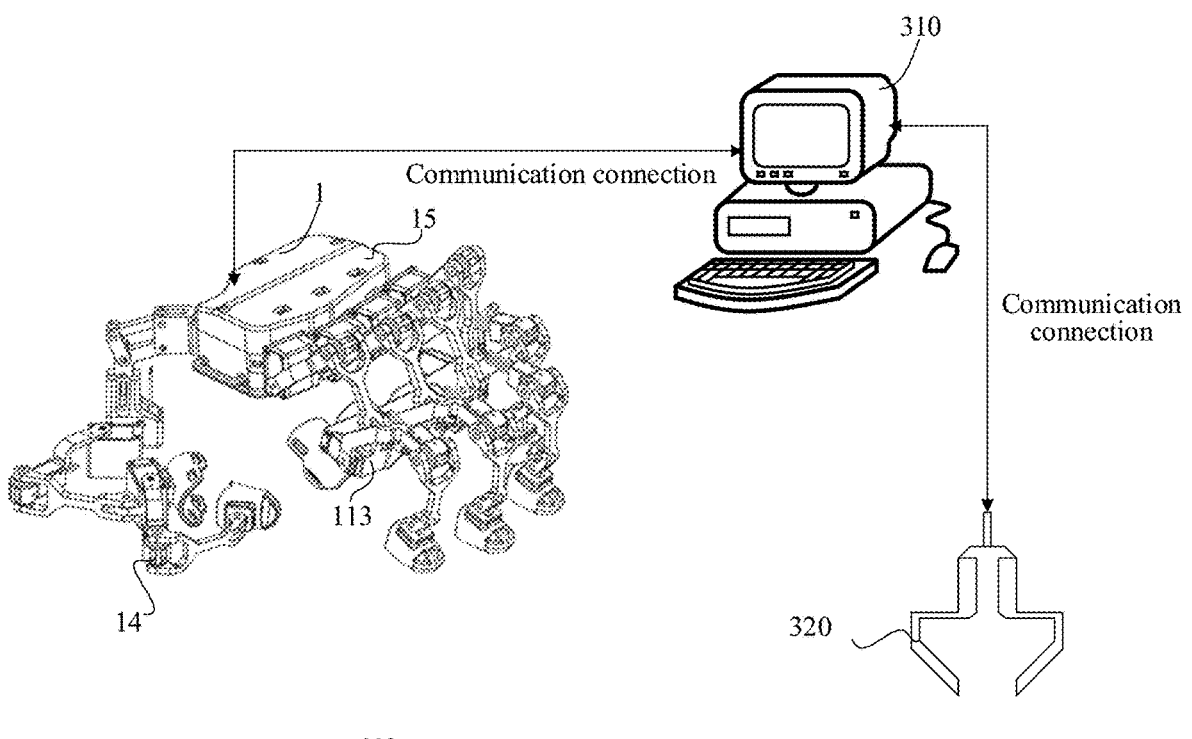
FIG. 16 is a schematic structural diagram of a simulated grabbing system according to certain embodiment(s) of the present disclosure.

FIG. 16 is a schematic structural diagram of a simulated grabbing system 300 according to an exemplary embodiment of the present disclosure, wherein the simulated grabbing system 300 includes a hand exoskeleton 1, a central control device 310 and a simulated grabbing apparatus 320.

The simulated grabbing apparatus 320 is configured to in response to grabbing of a target object, transmit a first control signal to the central control device 310, and the control signal is used for applying constraint to the hand exoskeleton 1. The central control device 310 is configured to forward the first control signal to the motor 113 of the hand exoskeleton 1. The motor 113 is configured to receive the first control signal, and control motion of the control rod assembly 112 on the basis of the first control signal 113.

Alternatively, the hand exoskeleton 1 is configured to receive the first control signal, wherein the first control signal is a signal which is generated in response to a user's operation on the hand exoskeleton 1; and transmit the first control signal to the central control device 310; the central control device 310 is configured to forward the first control signal to the simulated grabbing apparatus 320; and the simulated grabbing apparatus 320 is configured to receive the first control signal, and grab the target object on the basis of the first control signal.

In an alternative embodiment, the hand exoskeleton 1 is further configured to transmit attitude data of the hand exoskeleton 1 to the central control device 310 through the first encoder 14 and the second encoder 15, and the attitude data indicates the current attitude of the hand exoskeleton 1. The central control device 310 is further configured to receive the attitude data transmitted by the hand exoskeleton 1; generate a second control signal on the basis of the attitude data, wherein the second control signal is used for controlling motion of the simulated grabbing apparatus 320; and transmit the second control signal to the simulated grabbing apparatus 320. The simulated grabbing apparatus 320 is configured to receive the second control signal; and move on the basis of the second control signal.

In the embodiment of the present disclosure, the hand exoskeleton 1 is a hand exoskeleton 1 provided with a motor 113, a first encoder 14 and a second encoder 15. The hand exoskeleton 1 is in communication connection with the simulated grabbing apparatus 320 through the central control device 310.

The central control device 310 determines the current state of the hand exoskeleton 1 by receiving the angle recorded by the first encoder 14 and finger intorsion and extorsion degree recorded by the second encoder 15, and transmits the state data into the simulated grabbing apparatus 320 in a signal mode. In an example, the central control device 310 generates a control signal on the basis of the state data, and transmits the control instruction into the simulated grabbing apparatus 320.

The simulated grabbing apparatus 320 performs operation of simulated grabbing according to the received signal. When the operation of simulated grabbing enters a certain stage, for example, the simulated grabbing apparatus 320 grabs an object, a feedback signal is transmitted to the central control device 310. The central control device 310 forwards the feedback signal to the hand exoskeleton 1. After receiving the feedback signal, the motor 113 of the hand exoskeleton 1 constrains motion of the hand exoskeleton 1 according to the feedback signal.

According to the simulated grabbing system provided by the embodiment of the present disclosure, communication connection between the simulated grabbing apparatus and the hand exoskeleton is realized through the central control device, interaction of signals of the simulated grabbing apparatus and the hand exoskeleton is carried out according to the communication connection, thus, the motor may receive the feedback signal, motion of the hand exoskeleton is constrained, and man-machine interaction performance which can be provided by the hand exoskeleton is improved.

It should be understood that the terms "first", "second", and "third" in the present disclosure are merely intended for a purpose of description, and shall not be understood as indicating or implying relative significance or implicitly indicating the number of indicated technical features.

The technical solutions mentioned herein may be arbitrarily combined to form an embodiment of the present disclosure, and details are not described herein again.

The descriptions are merely embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A hand exoskeleton, comprising: at least one mechanical finger and a mechanical palm;

the mechanical finger comprising a first finger section, a second finger section, a first rod assembly, a second rod assembly, a first motor connected to the first rod assembly and configured to apply constraint to a motion of the first finger section, and a second motor connected to the second rod assembly and configured to apply constraint to a motion of the second finger section;

the first rod assembly being movably connected to the mechanical palm and the first finger section separately; and the second rod assembly being movably connected to the second finger section;

wherein the first motor and the second motor are same type of motors;

the first motor is located between the mechanical palm and the first rod assembly, and the mechanical palm is movably connected to a first end of the first rod assembly through the first motor, the first motor is connected to the mechanical palm through a motor rod;

the second motor is located between the first finger section and the second rod assembly, and a second end of the first rod assembly and the first finger section are movably connected to a first end of the second rod assembly through the second motor; and a second end of the second rod assembly is movably connected to the second finger section.

2. The hand exoskeleton according to claim 1, wherein the mechanical finger further comprises a third finger section; and the third finger section is located between the first finger section and the second finger section.

3. The hand exoskeleton according to claim 2, wherein the second rod assembly comprises a third rod assembly and a fourth rod assembly;

a first end of the third rod assembly is movably connected to the first finger section, and a second end of the third rod assembly is movably connected to the third finger section; and a first end of the fourth rod assembly is movably connected to the third finger section; and a second end of the fourth rod assembly is movably connected to the second finger section.

4. The hand exoskeleton according to claim 3, wherein the third rod assembly comprises a third rod joint, and the fourth rod assembly comprises a fourth rod joint; and the third rod joint is connected to the fourth rod joint.

5. The hand exoskeleton according to claim 4, wherein the third rod assembly comprises a fifth rod and a sixth rod, and the fourth rod assembly comprises a seventh rod, an eighth rod and a ninth rod;

the fifth rod and the sixth rod are connected to a third rod joint;

the seventh rod and the eighth rod are connected to a fourth rod second joint; and the third rod joint is connected to the fourth rod second joint through a tenth rod.

6. The hand exoskeleton according to claim 1, wherein the hand exoskeleton comprises a first mechanical finger and a second mechanical finger, and the hand exoskeleton further comprises an extension assembly;

the first rod assembly of the first mechanical finger is connected to the mechanical palm;

the extension assembly is located between the first rod assembly of the second mechanical finger and the mechanical palm, and the second mechanical finger is connected to the mechanical palm through the extension assembly; and a first end of the extension assembly is connected to the mechanical palm, and a second end of the extension assembly is connected to a first end of the first rod assembly of the second mechanical finger.

7. The hand exoskeleton according to claim 6, wherein the extension assembly comprises a bracket, an adjusting mechanism and a positioning member;

a first end of the bracket is connected to the mechanical palm;

a second end of the bracket is connected to a first end of the adjusting mechanism;

the adjusting mechanism is a four-bar linkage with a spring, and a second end of the adjusting mechanism is connected to a first end of the positioning member;

a second end of the positioning member is connected to a first end of the first rod assembly of the second mechanical finger; and the positioning member is provided with a positioning member encoder.

8. The hand exoskeleton according to claim 1, further comprising:

a first encoder and a second encoder, the rod assembly is correspondingly provided with a rod joint, and the motor is provided with a motor rod;

the first encoder is located on the rod assembly, and the first encoder is connected to the rod joint; and the second encoder is located on the mechanical palm, and the second encoder is connected to a first end of the motor rod.

9. The hand exoskeleton according to claim 1, wherein a revolute pair is arranged between the second rod assembly and the first finger section, and the revolute pair is controlled by the second motor.

10. The hand exoskeleton according to claim 1, wherein an output shaft of the first motor is fixedly connected to the first rod assembly, and an output shaft of the second motor is fixedly connected to the second rod assembly.

11. A medical device, comprising: a hand exoskeleton; and a medical central control device in communication with the hand exoskeleton, wherein the hand exoskeleton comprises:

at least one mechanical finger and a mechanical palm;

the mechanical finger comprising a first finger section, a second finger section, a first rod assembly, a second rod assembly, a first motor connected to the first rod assembly and configured to apply constraint to a motion of the first finger section, and a second motor connected to the second rod assembly and configured to apply constraint to a motion of the second finger section;

the first rod assembly being movably connected to the mechanical palm and the first finger section separately; and the second rod assembly being movably connected to the second finger section;

wherein the first motor and the second motor are same type of motors;

the first motor is located between the mechanical palm and the first rod assembly, and the mechanical palm is movably connected to a first end of the first rod assembly through the first motor, the first motor is connected to the mechanical palm through a motor rod;

the second motor is located between the first finger section and the second rod assembly, and a second end of the first rod assembly and the first finger section are movably connected to a first end of the second rod assembly through the second motor; and a second end of the second rod assembly is movably connected to the second finger section.

12. The medical device according to claim 11, wherein the mechanical finger further comprises a third finger section; and the third finger section is located between the first finger section and the second finger section.

13. The medical device according to claim 12, wherein the second rod assembly comprises a third rod assembly and a fourth rod assembly;

a first end of the third rod assembly is movably connected to the first finger section, and a second end of the third rod assembly is movably connected to the third finger section; and a first end of the fourth rod assembly is movably connected to the third finger section; and a second end of the fourth rod assembly is movably connected to the second finger section.

14. The medical device according to claim 13, wherein the third rod assembly comprises a third rod joint, and the fourth rod assembly comprises a fourth rod joint; and the third rod joint is connected to the fourth rod joint.

15. A simulated grabbing system, comprising: a hand exoskeleton; a central control device; and a simulated grabbing apparatus, the hand exoskeleton being in communication with the simulated grabbing apparatus through the central control device, wherein the hand exoskeleton comprises:

at least one mechanical finger and a mechanical palm;

the mechanical finger comprising a first finger section, a second finger section, a first rod assembly, a second rod assembly, a first motor connected to the first rod assembly and configured to apply constraint to a motion of the first finger section, and a second motor connected to the second rod assembly and configured to apply constraint to a motion of the second finger section;

the first rod assembly being movably connected to the mechanical palm and the first finger section separately; and the second rod assembly being movably connected to the second finger section;

wherein the first motor and the second motor are same type of motors;

the first motor is located between the mechanical palm and the first rod assembly, and the mechanical palm is movably connected to a first end of the first rod assembly through the first motor, the first motor is connected to the mechanical palm through a motor rod;

the second motor is located between the first finger section and the second rod assembly, and a second end of the first rod assembly and the first finger section are movably connected to a first end of the second rod assembly through the second motor; and a second end of the second rod assembly is movably connected to the second finger section.

\*    \*    \*    \*    \*